(12) United States Patent
Tsai et al.

(10) Patent No.: US 12,190,506 B2
(45) Date of Patent: Jan. 7, 2025

(54) INTERACTIVE IMAGE MARKING METHOD, ELECTRONIC DEVICE, AND RECORDING MEDIUM USING THE METHOD

(71) Applicant: NATIONAL CHENG KUNG UNIVERSITY, Tainan (TW)

(72) Inventors: Yi-Shan Tsai, Tainan (TW); Cheng-Shih Lai, Tainan (TW); Chao-Yun Chen, Tainan (TW); Meng-Jhen Wu, Tainan (TW); Yun-Chiao Wu, Tainan (TW); Hsin-Yi Feng, Taichung (TW); Po-Tsun Kuo, Taipei (TW); Kai-Yi Wang, Taichung (TW); Wei-Cheng Su, Taichung (TW)

(73) Assignee: NATIONAL CHENG KUNG UNIVERSITY, Tainan (TW)

( * ) Notice: Subject to any disclaimer, the term of this patent is extended or adjusted under 35 U.S.C. 154(b) by 523 days.

(21) Appl. No.: 17/561,618

(22) Filed: Dec. 23, 2021

(65) Prior Publication Data

US 2023/0013609 A1 Jan. 19, 2023

(30) Foreign Application Priority Data

Jul. 13, 2021 (TW) .................................. 110125657

(51) Int. Cl.
*G06T 7/00* (2017.01)
*G06T 11/60* (2006.01)

(52) U.S. Cl.
CPC ............ *G06T 7/0012* (2013.01); *G06T 11/60* (2013.01); *G06T 2207/10081* (2013.01); *G06T 2207/30204* (2013.01)

(58) Field of Classification Search
CPC .................. G06T 7/0012; G06T 11/60; G06T 2207/10081; G06T 2207/30204; G06T 2207/10116; G06T 2207/20096; G06T 2207/30056; G06T 2207/30084; G06T 2207/30096; G06T 7/174; G06T 7/11
See application file for complete search history.

(56) References Cited

U.S. PATENT DOCUMENTS

| 6,175,755 | B1* | 1/2001 | Hogg | ........................ G06T 7/62 |
| | | | | 600/407 |
| 2020/0167930 | A1* | 5/2020 | Wang | ........................ G06N 3/08 |
| 2020/0401854 | A1* | 12/2020 | Peng | .................... G06F 18/2155 |

FOREIGN PATENT DOCUMENTS

| CN | 108921854 A | 11/2018 |
| CN | 109658481 A | 4/2019 |

* cited by examiner

*Primary Examiner* — Brandon J Miller

(57) ABSTRACT

An interactive image marking method is introduced. The interactive image marking method includes the following steps, displaying a target image and at least one marked region in the target image; receiving an interactive signal, where the interactive signal corresponds to a first pixel of the target image; calculating a correlation between the first pixel and pixels of the target image, and determining a correlation range in the target image according to the correlation; editing the marked region according to the correlate range; and displaying the edited marked region. In addition, an electronic device and a recording medium using the method are also introduced.

21 Claims, 3 Drawing Sheets

INTERACTIVE IMAGE MARKING METHOD, ELECTRONIC DEVICE, AND RECORDING MEDIUM USING THE METHOD

CROSS-REFERENCE TO RELATED APPLICATION

This non-provisional application claims priority under 35 U.S.C. § 119(a) on Patent Application No. 110125657 filed in Taiwan, R.O.C. on Jul. 13, 2021, the entire contents of which are hereby incorporated by reference.

BACKGROUND OF THE INVENTION

1. Field of the Invention

The present disclosure relates to software methods for computer-based vision field, and in particular to an interactive image marking method.

2. Description of the Related Art

Diagnostic images are generated by modern medical imaging technologies, such as X-ray imaging, computed tomography, magnetic resonance imaging, nuclear medicine, and biopsies, to enable medical professionals to make accurate diagnoses. Therefore, some image analysis-oriented software technologies are applied to the reading and analyses of medical images.

Medical image analysis requirements vary from medical behavior or scenario to medical behavior or scenario. It is impractical to design specific software dedicate to every type of medical behavior or scenario. Therefore, it is important to provide a system which meets the needs of the largest possible number of users.

BRIEF SUMMARY OF THE INVENTION

An objective of the present disclosure is to provide an interactive image marking method, electronic device, recording medium and computer program product using the method, so as to enable interaction to take place between a user and a target image and determine how to mark the target image according to a signal sent by the user.

In an embodiment of the present disclosure, an interactive image marking method comprises the steps of: displaying a target image and at least one marked region in the target image; receiving an interactive signal, wherein the interactive signal corresponds to a first pixel of the target image; calculating a first correlation between the first pixel and pixels of the target image; determining a correlation range in the target image according to the first correlation; editing the at least one marked region according to the correlation range; and displaying the at least one marked region edited.

In an embodiment of the present disclosure, an electronic device comprises an input component, display unit, storage element and processor. The processor is coupled to the input component, display unit and storage element. The input component receives signals. The display unit displays images. The storage element stores modules, including an image displaying module, signal receiving module, range determining module and marking interaction module. The processor is adapted to access and execute the modules stored in the storage element. The image displaying module displays a target image and at least one marked region in the target image on the display unit. The signal receiving module receives an interactive signal through the input component. The interactive signal corresponds to a first pixel in the target image. The range determining module calculates a first correlation between the first pixel and pixels of the target image and determines a correlation range in the target image according to the first correlation. The marking interaction module edits the at least one marked region according to the correlation range. Moreover, the image displaying module further displays the marked region edited.

In an embodiment of the present disclosure, a non-transitory computer-readable recording medium for storing therein a program is provided. The interactive image marking method is carried out as soon as the program is loaded to a computer and executed thereon.

In an embodiment of the present disclosure, a computer program product storing therein a computer program and adapted for use in interactive image marking. The interactive image marking method is carried out as soon as the program is loaded to a computer and executed thereon.

DETAILED DESCRIPTION OF THE INVENTION

Figure 1:
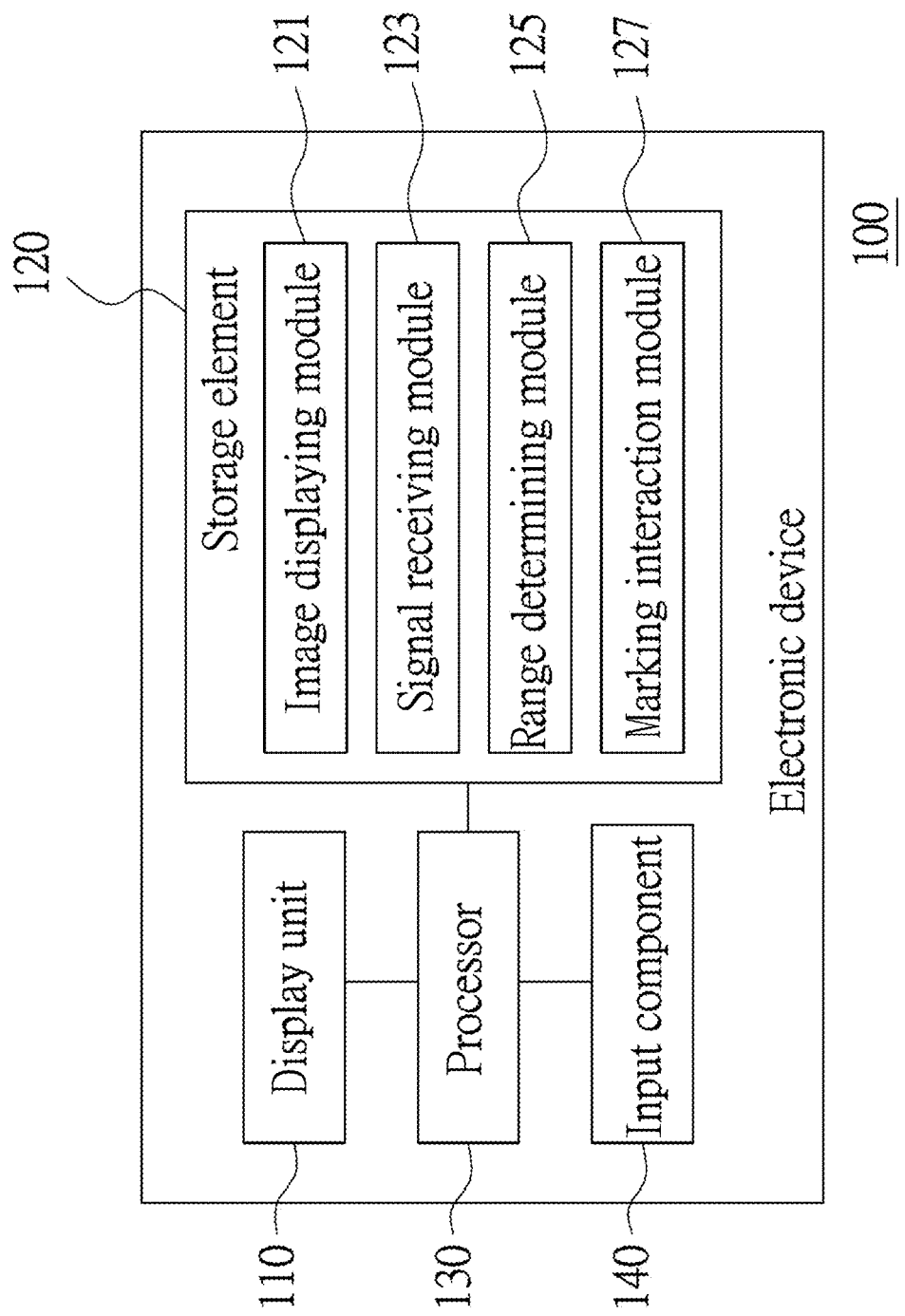
FIG. 1 is a block diagram of an electronic device in an embodiment of the present disclosure.

To facilitate understanding of the object, characteristics and effects of this present disclosure, embodiments together with the attached drawings for the detailed description of the present disclosure are provided.

Some of the embodiments of the present disclosure are hereunder depicted with accompanying drawings and described below. Regarding reference numerals used hereunder, when identical reference numerals are shown in different accompanying drawings, the reference numerals shall be deemed denoting identical or similar components. These embodiments are merely parts of the present disclosure but do not disclose all feasible embodiments of the present disclosure. To be precise, these embodiments merely define the scope of a method, device and system disclosed in the claims of the present disclosure.

The embodiments described hereunder are about computed tomography (CT) images. Each CT image is segmented into object regions, for example, a patient's internal organs, including the liver, kidneys, gallbladder, pancreas, spleen and lesions. From these object regions, users select one or more object regions of interest. The selected object regions are marked and displayed on a display unit and known as "marked region" in this embodiment. This embodiment provides an interactive image marking method whereby users quickly, conveniently and precisely edit or alter the scope of the marked region, for example, create marked regions, delete a part of a marked region or expand an existing marked region, but the present disclosure is not limited thereto. For instance, when a liver-related part of a computed tomography image is not completely segmented into one single object region, users can mark only "part of liver range" in the computed tomography image by selecting the object region. By contrast, the interactive image marking method in this embodiment allows a marked "part of liver range" to be expanded quickly, conveniently and precisely to become "full liver range". However, the present disclosure is not limited thereto. The interactive image marking method of the present disclosure is also applicable to images of any other scenarios and fields.

FIG. 1 is a block diagram of an electronic device in an embodiment of the present disclosure.

Referring to FIG. 1, in this embodiment, an electronic device 100 comprises a display unit 110, storage element 120, processor 130 and input component 140. The processor 130 is coupled to the display unit 110, storage element 120 and input component 140. The electronic device 100 is capable of performing image computation and is, for example, a personal computer, notebook computer, smartphone, tablet or personal digital assistant (PDA), but is not limited thereto.

The display unit 110 displays images and provides the images to users for watching. In this embodiment, display unit 110 is, for example, a liquid crystal display (LCD), light-emitting diode (LED) or field emission display (FED), but the present disclosure is not limited thereto.

The storage element 120 is, for example, fixed or movable, is random access memory (RAM), read-only memory (ROM), Flash memory, hard disk drive, the like, or a combination thereof, and is adapted to store files and data. In this embodiment, the storage element 120 records modules executed by the processor 130. The modules include an image displaying module 121, signal receiving module 123, range determining module 125 and marking interaction module 127.

The processor 130 is, for example, a central processing unit (CPU), microprocessor which is programmable to serve general or special purposes, digital signal processor (DSP), programmable controller, Application Specific Integrated Circuits (ASIC), programmable logic device (PLD), the like or a combination thereof. In this embodiment, the processor 130 is coupled to the display unit 110, storage element 120 and input component 140 to access the modules in the storage element 120 and thus work together with the display unit 110 and input component 140 to effect interactive image marking.

The input component 140 enables users to operate the electronic device 100 and receives signals generated as a result of user operation. The input component 140 is a keyboard, mouse, stylus, touch panel or trackball, which is externally connected to or built-in in the electronic device 100 and is coupled to the processor 130. In some embodiments, the input component 140 is integrated into the display unit 110 to form a touchscreen, such as a capacitive or resistive touchscreen for receiving users' touch-based inputs.

Figure 2:
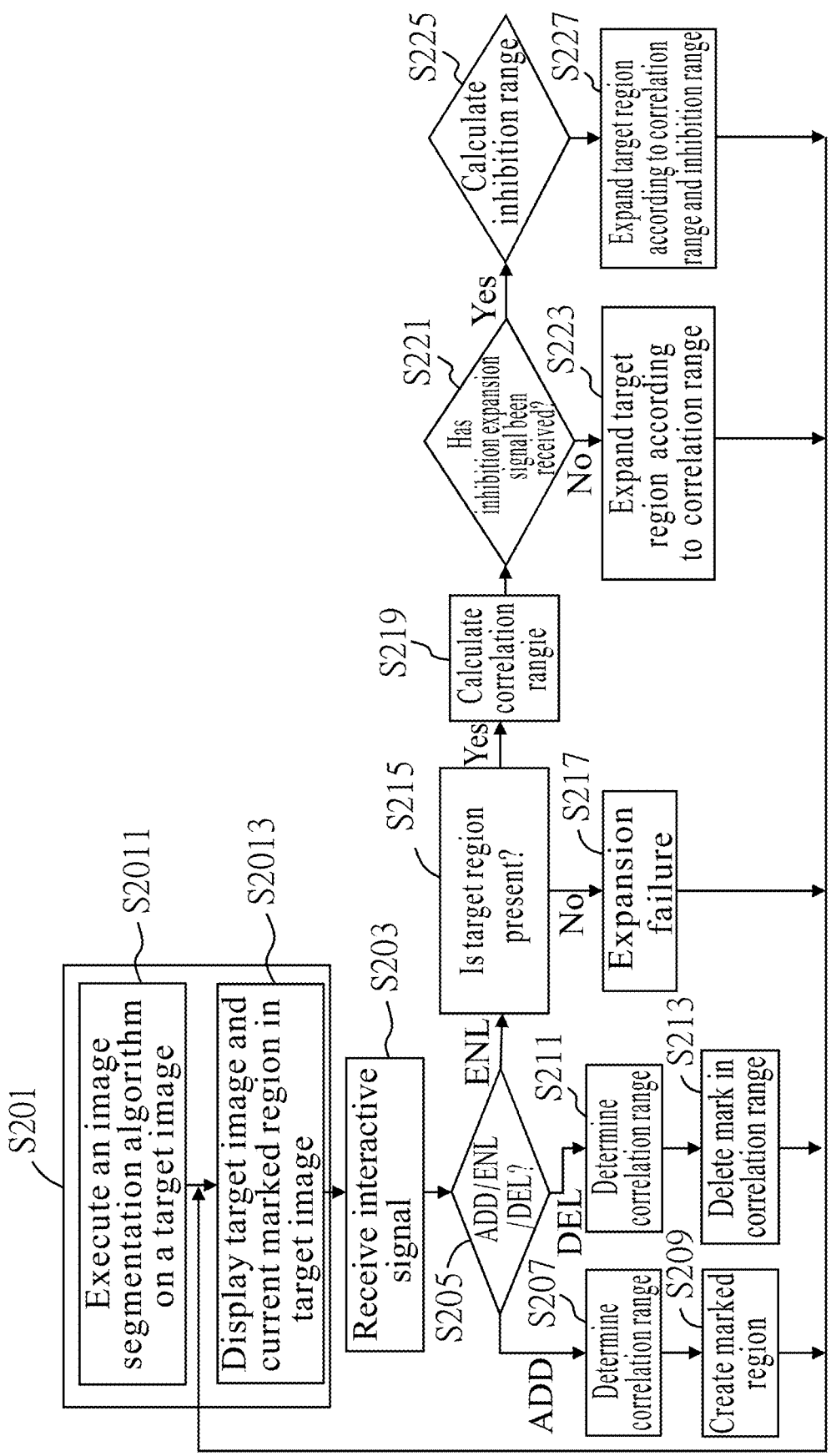
FIG. 2 is a schematic view of the process flow of an interactive image marking method according to an embodiment of the present disclosure.

FIG. 2 is a schematic view of the process flow of an interactive image marking method according to an embodiment of the present disclosure. The method applies to the electronic device 100 of FIG. 1. The details of the interactive image marking method of the present disclosure are hereunder described with reference to the constituent elements of the electronic device 100, but the interactive image marking method is not restricted to the electronic device 100.

Referring to FIG. 2, in step S201, the image displaying module 121 displays the target image and the current marked region in the target image on the display unit 110.

The target image comprises computer images of multiple pixels. The marked region is the marked region in the target image. The marks in regions vary from marked region to marked region. In some embodiments, after the display unit 110 has shown a target image, users use the input component 140 to interact with the displayed contents, for example, marking one or more specific regions in the target image to allow them to become marked regions, and the display unit 110 displays the current interaction result, for example, a marked region of the target image, but the present disclosure is not limited thereto.

The present disclosure is not restrictive of the way of marking or differentiating marked regions. In some embodiments, marked regions are marked and differentiated by color, allowing identical marked regions to be marked in the same color, and different marked regions to be marked in different colors. In some embodiments, marked regions are marked and differentiated through annotation.

In this embodiment, step 201 further comprises step S2011 and step S2013.

Referring to FIG. 2, in step S2011, the image segmentation module 121 of the electronic device 100 executes an image segmentation algorithm on the target image to obtain a result of image segmentation.

The image segmentation algorithm performs image segmentation on the target image and is, for example, a foreground segmentation algorithm for use in computer vision field. The image segmentation algorithm, for example, performs preprocessing, recognition, sorting and the like on the target image to segment the target image into multiple object regions. Take vehicular automation as an example, the target image is, for example, an image taken with a vehicular panoramic camera, and the image segmentation algorithm, for example, segments the image into multiple object regions related to a road, pedestrian, traffic light, street tree, vehicle, respectively. Take medical field as an example, the target image is, for example, a computed tomography image, and the image segmentation algorithm, for example, segments the image into object regions related to the liver, kidneys, gallbladder, pancreas, spleen and lesions, respectively, to function as an image segmentation result. However, the present disclosure is not limited thereto, and persons skilled in the art can design an image segmentation algorithm according to the target images, computation capabilities, and needs disclosed herein.

Figure 3:
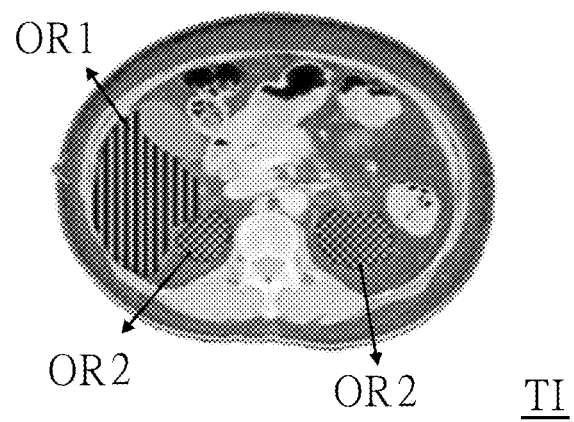
FIG. 3 is a schematic view of a target image according to an embodiment of the present disclosure.

FIG. 3 is a schematic view of a target image and a marked region in the target image according to an embodiment of the present disclosure.

Referring to FIG. 3, in this embodiment, target image TI is, for example, a computed tomography image, and the image segmentation algorithm is, for example, Graph Based Segmentation Algorithm in OpenCV, but the present disclosure is not limited thereto. In this embodiment, the image segmentation algorithm segments target image TI into liver OR1 marked in a grill-like pattern, kidneys OR2 marked in a lattice-like pattern, and object regions (not shown) related to gallbladder, pancreas, and spleen. In this embodiment, the image segmentation results, for example, comprises liver OR1, kidneys OR2, and object regions (not shown) related to gallbladder, pancreas, and spleen.

In step S2013, the image displaying module 121 displays a target image and a current marked region in the target image on the display unit 110. In step S203, the signal receiving module 123 receives an interactive signal through the input component 140.

In this embodiment, the interaction taking place between a target image and a user through the input component 140 comprises "increase", "expansion" and "deletion". Thus, the interactive signals include an increase signal, deletion signal and expansion signal. The "increase" interaction involves creating a new marked region in the target image. The "expansion" interaction involves expanding a specific marked region in the target image to expand the marking range of the marked region. The "delete" interaction involves deleting at least one portion of all the marked regions in the target image. The present disclosure is not restrictive of the switching method of the aforesaid three interaction modes, and thus persons skilled in the art can design related hardware or software as needed.

In this embodiment, if the target image has not yet got any markings (that is, when the target image has not yet got any marked regions therein), the display unit 110 will, in step S2013, for example, display a target image which has no marked regions. Conversely, if the target image has a marked region therein, the display unit 110 will, in step S2013, display a target image and current marked regions in the target image (that is, simultaneously display a target image and marked regions with marks).

Referring to FIG. 3, in this embodiment, users, for example, use the input component 140 to mark two object regions corresponding in position to liver and kidneys, to create two marked regions OR1, OR2. Therefore, the display unit 110 displays target image TI and marks the marked region OR1 (i.e., liver) and marked region OR2 (i.e., kidneys) in target image TI. The details about users' using the input component 140 to mark the object regions as marked regions are discussed below.

In step S205, the processor 130 determines whether an interactive signal received by the signal receiving module 123 is an increase signal ADD, expansion signal ENL or deletion signal DEL.

In some embodiments, users use the input component 140 to switch the electronic device 100 to the "increase" interaction mode and then send the increase signal ADD corresponding to a region to be marked, for example, by applying a first-category stroke to the region to be marked. Thus, the increase signal ADD corresponds to one or more pixels.

In some embodiments, users use the input component 140 to switch the electronic device 100 to "expansion" interaction mode and send the expansion signal ENL corresponding to an expansion region, for example, by applying a first-category stroke to the region to be expanded. Thus, the expansion signal ENL corresponds to one or more pixels.

In some embodiments, users use the input component 140 to switch the electronic device 100 to "delete" interaction mode and then send the deletion signal DEL corresponds to a region to undergo mark deletion, for example, by applying a first-category stroke to a region to undergo mark deletion. Therefore, the deletion signal DEL corresponds to one or more pixels.

The first-category stroke is different from a second-category stroke (The second-category stroke is defined and described later). For instance, the first-category stroke is in a specific color and the second-category stroke in another. For instance, the first-category stroke is applied with the left key of a mouse and the second-category stroke with the right key of the mouse. However, the present disclosure is not limited thereto.

If, in step S205, the processor 130 determines that the interactive signal received by the signal receiving module 123 is the increase signal ADD, the process flow of the method goes to step S207, allowing the range determining module 125 to determine the correlation range corresponding to the increase signal ADD. Then, the process flow of the method goes to step S209, allowing the marking interaction module 127 to create a marked region according to a correlation range.

In step S207, the range determining module 125 or marking interaction module 127 determines the pixels corresponding to the increase signal ADD, and then the range determining module 125 calculates the correlation range corresponding to the increase signal ADD according to the pixels corresponding to the increase signal ADD.

Figure 4:
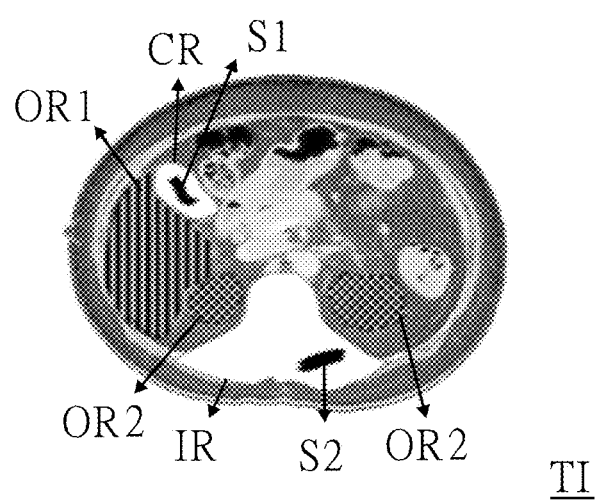
FIG. 4 is a schematic view of the interactive image marking method according to an embodiment of the present disclosure.

FIG. 4 is a schematic view of the interactive image marking method according to an embodiment of the present disclosure.

Referring to FIG. 4, in this embodiment, marked regions OR1, OR2 are, for example, two object regions corresponding in position to the liver and kidneys, respectively, and the increase signal ADD is, for example, first-category stroke S1. The range determining module 125 or marking interaction module 127 selects a predetermined number (for example, five) of equidistantly spaced apart pixels according to first-category stroke S1 to function as the pixels corresponding to the increase signal ADD. The range determining module 125 calculates first correlation between all the pixel points of unmarked regions in target image TI and the pixels corresponding to the increase signal ADD.

One or more features in the same marked region have high similarity levels. Therefore, the range determining module 125 calculates similarity levels of one or more features between the pixels corresponding to the increase signal ADD and all the pixel points of unmarked regions in target image TI. In some embodiments, the aforesaid features are, for example, color, texture, size or shape, but the present disclosure is not limited thereto.

In this embodiment, the range determining module 125 uses, for example, a machine learning model, to calculate the first correlation between the pixels corresponding to the increase signal ADD and the pixel points of unmarked regions in target image TI. For instance, the range determining module 125 calculates the average of the values of similarity levels between first pixel points of unmarked regions in target image TI and pixels corresponding to the increase signal ADD, respectively, and allows the calculated average to function as a first correlation between first pixel points and pixels corresponding to the increase signal ADD. Furthermore, the range determining module 125 calculates the average of the values of similarity levels between second pixel points of unmarked regions in target image TI and pixels corresponding to the increase signal ADD, respectively, and allows the calculated average to function as a first correlation between second pixel points and pixels corresponding to the increase signal ADD.

In this embodiment, the machine learning model, for example, consists of three modules, namely Distance maps fusion module, Pre-trained ResNet backbone and Deep-LabV3+Decoder, whereby similarity levels between pixel points of unmarked regions in target image TI and pixels corresponding to the increase signal ADD are outputted to function as the first correlation. However, the present disclosure is not restrictive of the machine learning model and will work provided that similarity levels between pixel points in target image TI and pixels corresponding to the increase signal ADD are calculated; thus, persons skilled in the art can design the present disclosure as needed.

In this embodiment, the range determining module 125 presets a first correlation threshold, selects, from all the pixel points of unmarked regions in target image TI, the pixel points whose first correlation is higher than the first correlation threshold, and allows the selected pixel points to function as correlation range CR (depicted as a white region which includes the first-category stroke S1) corresponding to the increase signal ADD.

In step S209, the marking interaction module 127 marks the pixels in correlation range CR corresponding to the increase signal ADD and allows the marked pixels to function as a new marked region. Finally, the process flow of the method returns to step S2013, allowing the display unit 110 to display target image TI and current marked regions. The new marked region is different from the current marked region in terms of marks. For instance, the current marked region comprises liver OR1 marked in a grill-like pattern and kidneys OR2 marked in a lattice-like pattern, whereas a new marked region is marked in a pattern which is neither grill-like nor lattice-like. For instance, the current marked region comprises liver OR1 marked in red and kidneys OR2 marked in blue, whereas a new marked region is marked neither in red nor in blue (for example, is marked in green). However, the present disclosure is not limited thereto.

In some embodiments, users, for example, the first correlation threshold is adjusted with the input component 140 to adjust the aforesaid correlation range CR and thus adjust the range of the new marked region.

The input component 140 not only sends interactive signals but also sends inhibition interactive signals, so as to circumvent the inhibition range corresponding to the inhibition interactive signals (and thus not to edit the inhibition range) while editing a marked region according to the correlation range corresponding to the interactive signals.

In some embodiments, in the "increase" interaction mode, users use the input component 140 to not only send the increase signal ADD (for example, the first-category stroke S1) corresponding to a region to be marked but also send the inhibition increase signal corresponding to an "unmarked region" to prevent the "unmarked region" from being marked because of the increase signal ADD. The inhibition increase signal is, for example, to apply a second-category stroke S2 in an unmarked region. Therefore, like the increase signal ADD, the inhibition increase signal also corresponds to one or more pixels.

Likewise, the range determining module 125 calculates all the pixel points of unmarked regions in target image TI and the second correlation between the pixels corresponding to the inhibition increase signal. Then, the range determining module 125 sets a second correlation threshold, selects, from all the pixel points of unmarked regions in target image TI, the pixel points whose second correlation is higher than the second correlation threshold, and let them define inhibition range IR (depicted as a white region which includes the second-category stroke S2). When correlation range CR is marked with the interaction module 127 to create a new marked region, inhibition range IR is not marked. Thus, even if the correlation between the pixel points in inhibition range IR and the pixels corresponding to the increase signal ADD is high, the pixel points in inhibition range IR will not be marked.

If, in step S205, the processor 130 determines that the interactive signal received by the signal receiving module 123 is the deletion signal DEL, the process flow of the method goes to step S211, allowing the range determining module 125 to determine the correlation range corresponding to the deletion signal DEL. Then, the process flow of the method goes to step S213, in which the marking interaction module 127 deletes marks in the correlation range from the marked region of target image TI.

Step S211 (the way of determining the correlation range corresponding to the deletion signal DEL) is similar to step S207 (the way of determining the correlation range corresponding to the increase signal ADD). In this embodiment, the range determining module 125 calculates the first correlation between the pixel points of all the marked regions in target image TI and the pixels corresponding to the deletion signal DEL, respectively. Then, the range determining module 125 sets the first correlation threshold, selects, from all the pixel points of all the marked regions in target image TI, the pixel points whose first correlation is higher than the first correlation threshold, and allows the selected pixel points to function as a correlation range (not shown) corresponding to the deletion signal DEL. The correlation range CR corresponding to the increase signal ADD lies in unmarked regions of target image TI, and the correlation range corresponding to the deletion signal DEL lies in marked regions of target image TI.

In step S213, the marking interaction module 127 deletes marks of pixel points in the correlation range from target image TI. Finally, the process flow of the method returns to step S2013, allowing the display unit 110 to display target image TI and current marked regions.

In some embodiments, users, for example, employ the input component 140 to adjust the first correlation threshold for use in determining the correlation range corresponding to the deletion signal DEL to therefore further adjust the range of deleting marks.

In some embodiments, in the "delete" interaction mode, the input component 140 not only sends the deletion signal DEL corresponding to regions to be deleted but also sends the inhibition deletion signal corresponding to regions not to be deleted, so as to prevent the regions not to be deleted from being deleted because of the deletion signal DEL. The inhibition deletion signal is, for example, to apply a second-category stroke in the regions not to be deleted. Therefore, like the deletion signal DEL, the inhibition deletion signal also corresponds to pixels.

Likewise, the range determining module 125 calculates the second correlation between all the pixel points of marked regions in target image TI and pixels corresponding to the inhibition deletion signal. Then, the range determining module 125 sets a second correlation threshold, selects, from all the pixel points of marked regions in target image TI, the pixel points whose second correlation is higher than the second correlation threshold, and allows the selected pixel points to function as the inhibition range. If the marking interaction module 127 is able to delete marks of pixel points in the correlation range, marks of pixel points in the inhibition range will not be deleted. Therefore, even if the correlation between the pixel points in inhibition range IR and the pixels corresponding to the deletion signal DEL is high, marks of the pixel points in the inhibition range IR cannot be deleted.

If, in step S205, the processor 130 determines that the interactive signal received by the signal receiving module 123 is the expansion signal ENL, the marking interaction module 127 will determine the target region according to the expansion signal ENL.

In step S215, the marking interaction module 127 determines whether the target region is present according to the expansion signal ENL. If the marking interaction module 127 determines that no target regions exist, the process flow of the method goes to step S217, allowing the image displaying module 121 to display a message of expansion failure on the display unit 110. If the marking interaction module 127 determines that a target region is present, the process flow of the method goes to step S219.

The marking interaction module 127 determines which of the marked regions in target image TI is to be expanded by the expansion signal ENL. The marked region to be expanded by the expansion signal ENL is the target region. In some embodiments, the marking interaction module 127 does not find any target regions corresponding to the expansion signal ENL in target image TI.

Referring to FIG. 4, in this embodiment, marked regions OR1, OR2 are, for example, two object regions corresponding in position to liver and kidneys, respectively. The expansion signal ENL is, for example, first-category stroke S1. The range determining module 125 or marking interaction module 127 selects a predetermined number (for example, five) of pixels spaced apart equidistantly and corresponding in position to the first-category stroke S1 and allows the selected pixels to function as the pixels corresponding to the expansion signal ENL.

The marking interaction module 127 calculates a distance relation between the pixels corresponding to the expansion signal ENL and marked regions OR1, OR2 and then selects a target region according to the distance relation. For instance, the expansion signal ENL expands the marked region least far away from the expansion signal ENL. Therefore, the marked region least far away from the expansion signal ENL is selected to be the target region. However, the present disclosure is not limited thereto.

In this embodiment, the marking interaction module 127 selects the marked region which is least far away from the expansion signal ENL and lies within the predetermined distance range of the pixels corresponding to the expansion signal ENL and allows the selected marked region to be the target region. Upon determination that marked regions do not exist within the distance range of the pixels corresponding to the expansion signal ENL, the process flow of the method goes to step S217. Conversely, if at least one marked region is present within the predetermined distance range of the pixels corresponding to the expansion signal ENL, the marking interaction module 127 selects the marked region least far away from the pixels corresponding to the expansion signal ENL and allows the selected marked region to function as a target region.

For instance, the pixels corresponding to the expansion signal ENL comprise a first pixel, second pixel, third pixel, fourth pixel and fifth pixel. The marking interaction module 127 searches a square block (centered at the first pixel and having a length of 10 pixels, for example) for the marked region least far away from the first pixel and records both the marked region and the distance between the selected marked region and the first pixel. Furthermore, the marking interaction module 127 searches a square block (centered at the second pixel and having a length of 10 pixels, for example) for the marked region least far away from the second pixel and records both the marked region and the distance between the selected marked region and the second pixel. By analogy, the marking interaction module 127 deals with the third pixel, fourth pixel and fifth pixel as well. A first marking block exists in a square block centered at the first pixel and is separated from the first pixel by the least distance of eight pixels. No marking block is found in square blocks centered at second pixel and third pixel. A first marking block and a second marking block exist in a square block centered at the fourth pixel and are separated from the fourth pixel by the shortest distance of eight pixels and 12 pixels, respectively. A first marking block exists in a square block centered at the fifth pixel and is separated from the fifth pixel by the shortest distance of six pixels. The marking interaction module 127 determines that the marking block nearest to the pixels corresponding to the expansion signal ENL is the first marking block and allows it to function as a target region. It is because the first marking block is separated from the pixels corresponding to the expansion signal ENL by the shortest distance of six pixels.

In this embodiment, the marking interaction module 127, for example, determines that the target region is marked region OR1, and the process flow of the method goes to step S219.

Like step S207, in step S219, the range determining module 125 determines the pixels corresponding to the expansion signal ENL and then calculates the correlation range corresponding to the expansion signal ENL according to the pixels corresponding to the expansion signal ENL.

In this embodiment, the range determining module 125 calculates a first correlation between each pixel point of an unmarked region in target image TI and the pixels corresponding to the expansion signal ENL. Then, the range determining module 125 sets a first correlation threshold, searches all the pixel points of unmarked regions in target image TI for the pixel points whose first correlation is higher than the first correlation threshold, and allows them to function as correlation range CR corresponding to the expansion signal ENL. Thus, correlation range CR corresponding to the expansion signal ENL lies in the unmarked regions of target image TI. In this embodiment, the first correlation is, for example, the similarity level of one or more features, but the present disclosure is not limited thereto.

In some embodiments, the range determining module 125 sets a first correlation threshold according to the distance between each pixel corresponding to the expansion signal ENL and a target region, whereas the distance between the first correlation threshold, the pixels corresponding to the expansion signal ENL, and the target region are negatively correlated. Thus, the greater the distance between the pixels corresponding to the expansion signal ENL and the target region is, the less is the first correlation threshold, and the greater is the correlation range corresponding to the expansion signal ENL.

For instance, the range determining module 125 calculates a first correlation threshold according to the equation below.

$$TH1 = 1 - C^*(dis)^{1/2}$$

TH1 denotes the first correlation threshold, dis denotes the distance between each pixel corresponding to the expansion signal ENL and a target region, and C is a constant. In some embodiments, C is, for example, 0.02, but the present disclosure is not limited thereto.

Moreover, in some embodiments, the distance dis between each pixel corresponding to the expansion signal ENL and a target region is the least distance between each pixel corresponding to the expansion signal ENL and a target region in step S215, for example, six pixels. In some embodiments, the distance dis between each pixel corresponding to the expansion signal ENL and a target region is also the least distance between the center of the first-category stroke S1 and the target region. However, the present disclosure is not restricted to the aforesaid definition of the distance dis, and persons skilled in the art can design its definition as needed.

Referring to FIG. 2, in step S221, the processor 130 determines whether the signal receiving module 123 has received an inhibition expansion signal. If the signal receiving module 123 has not received any inhibition expansion signal, the process flow of the method goes to step S223, allowing the marking interaction module 127 to expand the target region according to the correlation range.

In step S223, the marking interaction module 127 expands the marking correlation range to a target region, by adding marks to the pixels in the correlation range, wherein the marks added are the same as those in the target region. After that, the process flow of the method returns to step S2013, displaying target image TI and current marked region on the display unit 110. For instance, the current marked region, for example, comprises marked region OR1 (i.e., liver) marked in a grill-like pattern and marked region OR2 (i.e., kidneys) marked in a lattice-like pattern, wherein the target region is, for example, marked region OR1 marked in a grill-like pattern. The marking interaction module 127 adds grill-like marks to the pixel points in the correlation range to expand target region OR1 marked in a grill-like pattern. For instance, the current marked region comprises marked region OR1 (i.e., liver) marked in red and marked region OR2 (i.e., kidneys) marked in blue, wherein the target region is, for example, marked region OR1 marked in red. The marking interaction module 127 adds red marks to the pixel points in the correlation range to expand target region OR1 marked in red.

In some embodiments, users, for example, adjust the first correlation threshold with the input component 140 to adjust the correlation range and thus further adjust the expansion range of a target region.

If the signal receiving module 123 receives an inhibition expansion signal, the process flow of the method goes to step S225. In step S225, the range determining module 125 or marking interaction module 127 determines pixels corresponding to an inhibition expansion signal, and then the range determining module 125 calculates the inhibition range corresponding to the inhibition expansion signal according to the pixels corresponding to the inhibition expansion signal.

In this embodiment, in the "expansion" interaction mode, users employ the input component 140 to not only send the expansion signal ENL corresponding to regions to be expanded but also send an inhibition expansion signal corresponding to the "non-expansion regions" to prevent the "non-expansion regions" from being marked because of the expansion signal ENL. The inhibition expansion signal is, for example, to apply the second-category stroke S2 in the "non-expansion regions". Therefore, like the expansion signal ENL, the inhibition expansion signal corresponds to one or more pixels.

Referring to FIG. 4, in this embodiment, marked regions OR1, OR2 are, for example, two object regions related to liver and kidneys, respectively. The expansion signal ENL is, for example, the first-category stroke S1. The inhibition expansion signal is, for example, the second-category stroke S2. The range determining module 125 selects a predetermined number (for example, five) of equidistantly spaced apart pixel points according to the second-category stroke S2 and allows the selected pixel points to function as the pixels corresponding to the inhibition expansion signal.

Likewise, the range determining module 125 calculates a second correlation between all the pixel points of unmarked regions in the target image TI and pixels corresponding to the inhibition increase signal. Then, the range determining module 125 sets a second correlation threshold, searches all the pixel points of unmarked regions in target image TI for the pixel points whose second correlation is higher than the second correlation threshold, and allows the pixel points to function as inhibition range IR. In this embodiment, the second correlation is, for example, a similarity level of one or more features, but the present disclosure is not limited thereto.

In step S227, the marking interaction module 127 expands the target region according to the correlation range and inhibition range.

In step S227, the marking interaction module 127 expands the marking correlation range to the target region but does not expand the marking inhibition range to the target region. Finally, the process flow of the method returns to step S2013 in which the display unit 110 displays target image TI and a current marked region. For instance, the current marked region, for example, comprises liver OR1 marked in red and kidneys OR2 marked in blue, wherein the current marked region, for example, comprises the target region (liver OR1) marked in red. The marking interaction module 127 adds red marks to the pixel points in correlation range CR, so as to expand marking correlation range CR to the target region OR1 while avoiding expanding marks to pixel points in inhibition range IR. Thus, even if the correlation between the pixel points in inhibition range IR and the pixels corresponding to the expansion signal ENL is high, the pixel points will not be expanded and marked to the target region.

An embodiment of the present disclosure provides a computer-readable recording medium for storing therein a program, as exemplified by the storage element 120 shown in FIG. 1. The interactive image marking method described in the aforesaid embodiments is carried out as soon as the program is loaded to a computer and executed thereon.

An embodiment of the present disclosure provides a computer program product storing therein a computer program and adapted for use in interactive image marking. The interactive image marking method described in the aforesaid embodiments is carried out as soon as the program is loaded to a computer and executed thereon. Therefore, the program or software for use in the interactive image method is stored in the computer-readable recording medium. Furthermore, the computer program product is provided through, for example, network-based transmission.

The embodiments of the present disclosure provide an interactive image marking method, electronic device, recording medium and computer program product using the method to allow users to intuitively edit marked regions in a target image with interactive signals, including creating a marked region, deleting part of a mark, and expanding a marked region. Moreover, for the sake of editing, the interactive image marking method is effective in precisely determining the correlation range corresponding to an interactive signal according to an interactive signal from a user. Thus, the present disclosure is conducive to enhancement of marking efficiency and precision of target images and the resultant user experience.

While the present disclosure has been described by means of specific embodiments, numerous modifications and variations could be made thereto by those skilled in the art without departing from the scope and spirit of the present disclosure set forth in the claims.

What is claimed is:

1. An interactive image marking method, comprising the steps of:
   displaying a target image and at least one marked region in the target image;
   receiving an interactive signal, wherein the interactive signal corresponds to a first pixel of the target image;
   calculating a first correlation between the first pixel of the target image and other pixels of the target image;

determining a correlation range in the target image according to the first correlation;

editing the at least one marked region according to the correlation range; and displaying the at least one marked region edited;

wherein the interactive signal is an expansion signal, and the interactive image marking method further comprises:

calculating a distance relation between the first pixel and the at least one marked region; and selecting a target region from the at least one marked region according to the distance relation, wherein the step of editing the at least one marked region according to the correlation range comprises marking the correlation range to expand the target region.

2. The interactive image marking method of claim 1, wherein the interactive signal is a first-category stroke.

3. The interactive image marking method of claim 2, wherein the step of calculating the first correlation between the first pixel of the target image and the other pixels of the target image comprises selecting a predetermined number of pixels spaced apart equidistantly and corresponding in position to the first-category stroke and allowing the selected pixels to function as the first pixel.

4. The interactive image marking method of claim 1, further comprising:

receiving an inhibition interactive signal, wherein the inhibition interactive signal corresponds to a second pixel in the target image;

calculating a second correlation between the second pixel of the target image and other pixels of the target image; and determining an inhibition range in the target image according to the second correlation, wherein editing the at least one marked region according to the correlation range is not accompanied by editing the inhibition range.

5. The interactive image marking method of claim 4, wherein the interactive signal is a first-category stroke, and the inhibition interactive signal is a second-category stroke.

6. The interactive image marking method of claim 5, wherein the first-category stroke and the second-category stroke differ in color.

7. The interactive image marking method of claim 1, wherein the step of calculating the first correlation between the first pixel of the target image and the other pixels of the target image comprises:

determining a similarity threshold according to a distance between the first pixel and the target region, wherein the similarity threshold and the distance are negatively correlated; and calculating first similarity levels between the first pixel of the target image and the other pixels of the target image and allowing the first similarity levels to function as the first correlation.

8. The interactive image marking method of claim 7, wherein the step of determining the correlation range in the target image according to the first correlation comprises determining the correlation range according to the first similarity levels and the similarity level threshold.

9. The interactive image marking method of claim 8, further comprising:

receiving an inhibition expansion signal, wherein the inhibition expansion signal corresponds to a second pixel in the target image;

calculating second similarity levels between the second pixel of the target image and other pixels in the target image; and determining an inhibition range according to the second similarity levels, wherein marking the correlation range to expand the target region is not accompanied by marking the inhibition range.

10. The interactive image marking method of claim 9, wherein the expansion signal is a first-category stroke, and the inhibition expansion signal is a second-category stroke.

11. A non-transitory computer-readable recording medium for storing therein a program, wherein the interactive image marking method of claim 1 is carried out as soon as the program is loaded to a computer and executed thereon.

12. An electronic device, comprising:

an input component for receiving a signal;

a display unit for displaying an image;

a storage element for storing modules; and a processor coupled to the input component, the display unit and the storage element and adapted to access and execute the storage element for storing the modules, the modules comprising:

an image displaying module for displaying a target image and at least one marked region in the target image on the display unit;

a signal receiving module for receiving an interactive signal through the input component, wherein the interactive signal corresponds to a first pixel in the target image;

a range determining module for calculating a first correlation between the first pixel of the target image and other pixels of the target image and determining a correlation range in the target image according to the first correlation; and a marking interaction module for editing the at least one marked region according to the correlation range, wherein the image displaying module displays the at least one marked region edited;

wherein the interactive signal is an expansion signal and the marking interaction module:

calculates a distance relation between the first pixel and the at least one marked region; and selects a target region from the at least one marked region according to the distance relation, wherein the marking interaction module's editing the at least one marked region according to the correlation range entails marking the correlation range to expand the target region.

13. The electronic device of claim 12, wherein the interactive signal is a first-category stroke.

14. The electronic device of claim 13, wherein calculating the first correlation between the first pixel of the target image and the other pixels of the target image with the range determining module is further accompanied by selecting a predetermined number of pixels spaced apart equidistantly and corresponding in position to the first-category stroke and allowing the selected pixels to function as the first pixel.

15. The electronic device of claim 12, wherein the signal receiving module receives an inhibition interactive signal through the input component, whereas the inhibition interactive signal corresponds to a second pixel in the target image, wherein the range determining module:

calculates a second correlation between the second pixel of the target image and other pixels of the target image; and determines an inhibition range in the target image according to the second correlation, wherein editing the at least one marked region according to the correlation range is not accompanied by editing the inhibition range.

16. The electronic device of claim 15, wherein the interactive signal is a first-category stroke, and the inhibition interactive signal is a second-category stroke.

17. The electronic device of claim 16, wherein the first-category stroke and the second-category stroke differ in color.

18. The electronic device of claim 12, wherein the range determining module's calculating the first correlation between the first pixel of the target image and the other pixels of the target image entails:
- determining a similarity threshold according to a distance between the first pixel and the target region, wherein the similarity threshold and the distance are negatively correlated; and
- calculating first similarity levels between the first pixel of the target image and the other pixels of the target image and allowing the first similarity levels to function as the first correlation.

19. The electronic device of claim 18, wherein the range determining module's determining the correlation range in the target image according to the first correlation entails determining the correlation range according to the first similarity levels and the similarity level threshold.

20. The electronic device of claim 19, wherein the signal receiving module receives an inhibition expansion signal through the input component, and the inhibition expansion signal corresponds to a second pixel in the target image, wherein the range determining module:
- calculates second similarity levels between the second pixel of the target image and other pixels in the target image; and
- determines an inhibition range according to the second similarity levels, wherein marking the correlation range to expand the target region is not accompanied by marking the inhibition range.

21. The electronic device of claim 20, wherein the expansion signal is a first-category stroke, and the inhibition expansion signal is a second-category stroke.

* * * * *